US010616962B2

(12) United States Patent
Imai

(10) Patent No.: US 10,616,962 B2
(45) Date of Patent: Apr. 7, 2020

(54) HEATING DEVICE FOR COOKING

(71) Applicant: Panasonic Intellectual Property Management Co., Ltd., Osaka (JP)

(72) Inventor: Hirohisa Imai, Shiga (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 381 days.

(21) Appl. No.: 15/500,963

(22) PCT Filed: Feb. 17, 2016

(86) PCT No.: PCT/JP2016/000815
§ 371 (c)(1),
(2) Date: Feb. 1, 2017

(87) PCT Pub. No.: WO2016/143267
PCT Pub. Date: Sep. 15, 2016

(65) Prior Publication Data
US 2017/0223782 A1 Aug. 3, 2017

(30) Foreign Application Priority Data

Mar. 10, 2015 (JP) .................................. 2015-046581
May 21, 2015 (JP) .................................. 2015-103416

(51) Int. Cl.
H05B 6/64 (2006.01)
F24C 7/08 (2006.01)
H05B 6/68 (2006.01)

(52) U.S. Cl.
CPC ............. *H05B 6/6441* (2013.01); *F24C 7/08* (2013.01); *H05B 6/68* (2013.01); *Y02B 40/143* (2013.01)

(58) Field of Classification Search
None
See application file for complete search history.

(56) References Cited

U.S. PATENT DOCUMENTS 4,454,501 A * 6/1984 Butts ..................... F24C 7/087
126/39 BA
5,426,280 A * 6/1995 Smith .................. H05B 6/6441
219/506

(Continued)

FOREIGN PATENT DOCUMENTS

JP 60-112185 6/1985
JP 62-014263 A 1/1987

(Continued)

OTHER PUBLICATIONS

International Search Report of PCT application No. PCT/JP2016/000815 dated May 17, 2016.

*Primary Examiner* — Ibrahime A Abraham
*Assistant Examiner* — Elizabeth M Sims
(74) *Attorney, Agent, or Firm* — McDermott Will & Emery LLP

(57) ABSTRACT

A heating cooker includes a heating chamber in which an object to be heated is stored, a heating unit heating the object to be heated stored in the heating chamber, an imaging unit imaging an inside of the heating chamber, and a reading unit extracting a character of heating control information from an attachment attached to the object to be heated and reading that character. The heating cooker further includes a heating control unit controlling the heating unit based on the heating control information read by the reading unit. In this manner, heating time can be automatically set without a clerk having to input a product heating time or select a button corresponding to a product and a hassle attributable to registration of a relationship between a product code and the heating time can be avoided.

4 Claims, 10 Drawing Sheets

(56) References Cited

U.S. PATENT DOCUMENTS

| | | | |
|---|---|---|---|
| 5,724,244 A | 3/1998 | Yabuki | |
| 5,938,966 A * | 8/1999 | Oh | H05B 6/6441 |
| | | | 219/702 |
| 2013/0001221 A1* | 1/2013 | Lambert | H05B 6/6441 |
| | | | 219/710 |
| 2013/0334214 A1* | 12/2013 | Yogev | H05B 6/6441 |
| | | | 219/702 |
| 2017/0223782 A1 | 8/2017 | Mai | |

FOREIGN PATENT DOCUMENTS

| | | | |
|---|---|---|---|
| JP | 8-291914 A | | 11/1996 |
| JP | 3036671 U | | 5/1997 |
| JP | 2000-209443 | | 7/2000 |
| JP | 2001-124345 A | | 5/2001 |
| JP | 2001-324146 | | 11/2001 |
| JP | 2001-349546 | | 12/2001 |
| JP | 2002-156117 A | | 5/2002 |
| JP | 2002243161 A | * | 8/2002 |
| JP | 3103186 U | | 7/2004 |
| JP | 2005-140418 A | | 6/2005 |
| JP | 2010-061382 | | 3/2010 |
| JP | 2013-235426 A | | 11/2013 |
| JP | 2013235426 A | * | 11/2013 |
| JP | 6149263 B2 | | 6/2017 |

\* cited by examiner

US 10,616,962 B2

HEATING DEVICE FOR COOKING

This application is a U.S. national stage application of the PCT International Application No. PCT/JP2016/000815 filed on Feb. 17, 2016, which claims the benefit of foreign priorities of Japanese patent applications 2015-046581 and 2015-103416 filed on Mar. 10, 2015 and May 21, 2015, respectively, the contents all of which are incorporated herein by reference.

TECHNICAL FIELD

The present invention relates to a heating cooker heating food.

BACKGROUND ART

A microwave oven, which is a typical heating cooker, is convenient in that it can heat food with the food being in a container without a pot or a frying pan having to be used. In stores selling box lunches in containers, side dishes in containers, or the like, clerks provide a service by heating purchased food with microwave ovens and providing the heated food.

This type of food-heating service will be described below. In general, optimal heating time is displayed on a box lunch or a side dish with regard to microwave oven-based heating. A store clerk performs heating after seeing the display and setting heating time in a microwave oven. An operation unit of the microwave oven has number keys and the like, and the heating time (min, sec) can be manually set.

In some cases, a microwave oven has a plurality of operation buttons and the operation buttons are assigned with different heating times. In this case, a store clerk can provide a customer with food or the like after heating the food or the like based on heating control suitable for the food or the like by selecting one of the buttons corresponding to the food or the like to be heated.

In the case of number key-based heating time (min, sec) setting as in the former configuration, the number of operations is large and the heating is likely to be inconvenient. In the case of the latter configuration, that is, in a case where the plurality of operation buttons are assigned with different heating times, an increase in the number of food types is likely to make it difficult to learn about a relationship of correspondence between the buttons and the heating times.

In order to cope with this inconvenience, mistakes, and the like, a method has been proposed for a heating cooker storing heating control content by product in advance, a store clerk's reading a product code information by using a barcode reader, and the heating cooker performing appropriate heating by calling the heating control content corresponding to a product from the code information.

Another method using no barcode reader has been proposed, too. According to this method, a camera that images an inside of a chamber of a microwave oven is provided, a barcode part is extracted from an image of a product in the chamber, and this barcode is read so that appropriate heating is performed by the heating control content corresponding to the product being called from the code information. This method reduces clerks' operation burdens and allows the clerks to provide an error-free heating service (refer to, for example, PTL 1).

In general, barcodes are attached to box lunches, side dishes, and the like that are available at stores. Information included in such barcodes is information for identification of products such as the box lunches and the side dishes, and heating time information is not included in such barcodes. Accordingly, a relationship of correspondence between a product and heating time needs to be registered in advance in a microwave oven for automatic heating time setting to be performed based on barcode recognition.

The number of products such as box lunches and side dishes that are targets of microwave oven-based heating handled at stores is extremely large. In some cases, new products are supplied on a daily basis or on a weekly basis to replace old ones, and operations for registering the relationship of correspondence between the new products and heating times in microwave ovens continue to occur at all times.

Some large stores run a plurality of microwave ovens so that a plurality of products can be heated at the same time. In this case, operations for registering the relationship of correspondence between product identification codes and heating times have to be performed on all of the plurality of microwave ovens. Then, it cannot be said that inconvenience is addressed.

In addition, a plurality of products are purchased at the same time in a store in some cases. In this case, a clerk has to put one product in a microwave oven chamber at a time and repeat a barcode-reading operation. Then, it cannot be said that inconvenience is addressed.

Furthermore, in a case where barcode reading fails after a product is put into a microwave oven chamber, a door is closed, and the barcode reading is initiated, a clerk has to frequently perform door opening and closing and put the product in anew frequently. Then, it cannot be said that inconvenience is addressed.

CITATION LIST

Patent Literature

PTL 1: Japanese Patent Unexamined Publication No. 2001-349546

SUMMARY OF THE INVENTION

The present invention has been made to solve the above problems and allows heating time to be automatically set without a clerk having to input a product heating time or select a button corresponding to a product and a hassle attributable to registration of a relationship between a product code and the heating time to be avoided.

A heating cooker according to the present invention includes a heating chamber in which an object to be heated is stored, a heating unit heating the object to be heated stored in the heating chamber, an imaging unit imaging an inside of the heating chamber, a reading unit extracting a character of heating control information from an attachment attached to the object to be heated and reading that character, and a heating control unit controlling the heating unit based on the heating control information read by the reading unit.

According to this configuration, the imaging unit can image the inside of the heating chamber, the reading unit can extract the character of the heating control information (including at least a number) from the captured image and read that character, and the heating control unit can control the heating unit based on the read heating control information. Therefore, heating time can be automatically set without a clerk having to input a product heating time or select a button corresponding to a product and a hassle attributable to registration of a relationship between a product code and the heating time can be avoided.

According to the present invention, the character or the number of the heating control information displayed in the product can be read in a case where the heating target product such as a box lunch and a side dish is in the heating chamber, and then the product can be heated by the heating control unit controlling the heating unit based on the heating control information. Therefore, the heating time can be automatically set without a clerk having to input a product heating time or select a button corresponding to a product and a hassle attributable to registration of a relationship between a product code and the heating time can be avoided.

DESCRIPTION OF EMBODIMENTS

Hereinafter, embodiments of the present invention will be described. The present invention is not limited to the following embodiments.
(First Embodiment)

A first embodiment of the present invention will be described first.

Figure 1:
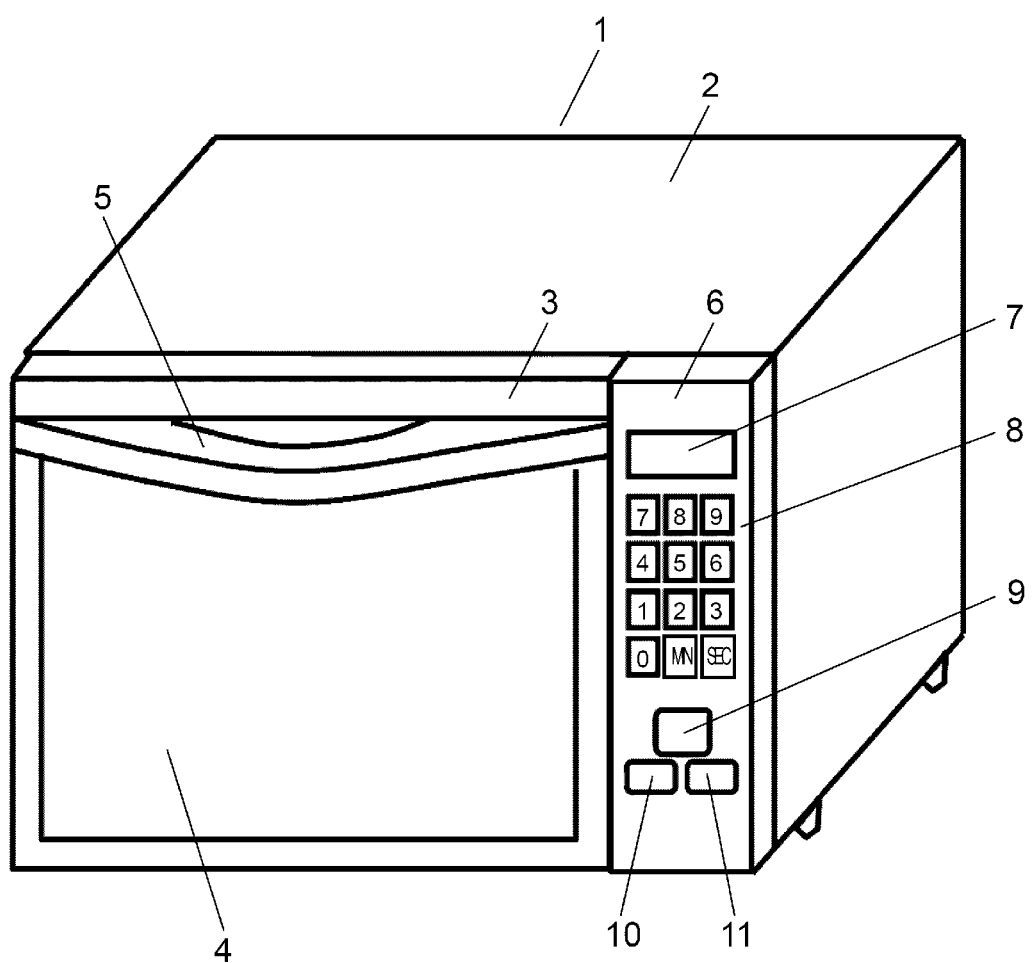
FIG. 1 is an external perspective view of a microwave oven that is an example of a heating cooker according to a first embodiment of the present invention.

FIG. 1 is an external perspective view of microwave oven 1 that is an example of a heating cooker according to the first embodiment of the present invention.

As illustrated in FIG. 1, microwave oven 1 has door 3 disposed for food to be put into and taken out from housing 2 for food storage. Transparent glass window 4 for allowing an inside of housing 2 to be seen from an outside, handle 5 grasped when door 3 is opened or closed, and operation display unit 6 are disposed on door 3.

Operation display unit 6 is provided with liquid crystal display 7, time setting button group 8, heating start button 9, cancel button 10, and pause button 11. As described later, microwave oven 1 images a product as a heating target (object to be heated) with an imaging unit, reads a heating time displayed on the product, and heats the product for that heating time.

The read heating time is displayed by liquid crystal display 7. Time setting button group 8 is disposed in microwave oven 1 for a case where the heating time is not read well or a case where heating is performed on a product displaying no heating time. A user can set the heating time by using a number button and "minute" and "second" buttons. In this case, the set heating time is displayed by liquid crystal display 7.

Heating start button 9 is a button that is pressed by the user for the heating to be initiated after the heating time displayed by liquid crystal display 7 is confirmed by the user. Cancel button 10 is a button that is pressed in a case where the heating is to be stopped during the heating or pressed in a case where the setting of the heating time displayed by liquid crystal display 7 is to be cancelled after the heating has been initiated by heating start button 9 being pressed by the user. Pause button 11 is a button that is pressed by the user in a case where the heating is to be temporarily stopped during the heating. In a case where the heating has been paused, the remaining heating can be continued by the user pressing heating start button 9 again.

Figure 2:
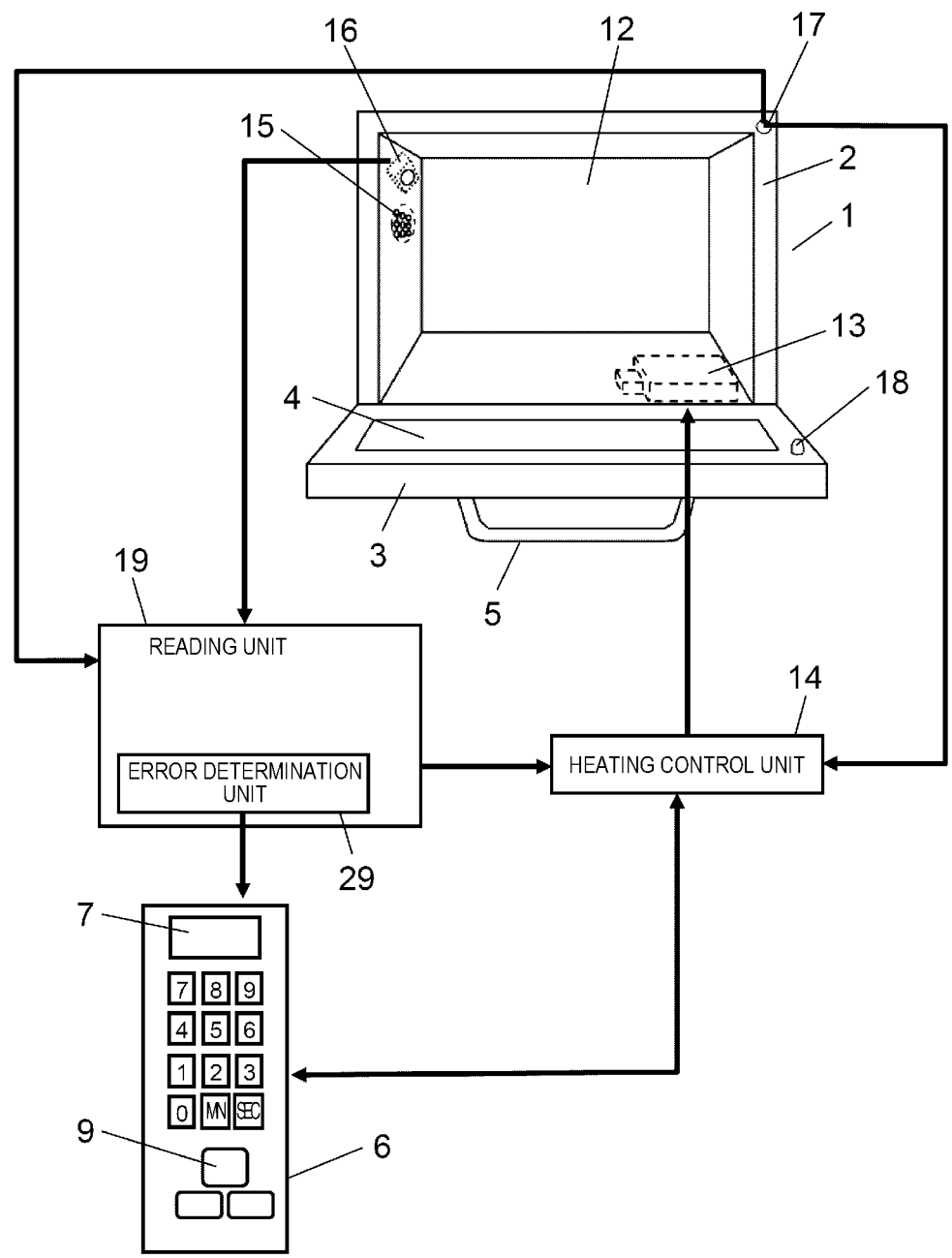
FIG. 2 is a schematic configuration diagram of the microwave oven according to the first embodiment of the present invention.

FIG. 2 is a schematic configuration diagram of microwave oven 1 according to the first embodiment of the present invention.

Microwave oven 1 is capable of high frequency-based food heating. Microwave oven 1 is provided with magnetron 13, which is a heating unit that outputs a high frequency, in heating chamber 12 storing the object to be heated such as the food. Microwave oven 1 heats the food by supplying the high frequency to heating chamber 12. Magnetron 13 is controlled by heating control unit 14.

Microwave oven 1 is provided with lamp 15 and camera 16 that is the imaging unit sharing the same side surface with lamp 15. Camera 16 captures an image of an inside of heating chamber 12. Since camera 16 and lamp 15 are placed on the same side surface, the inside of heating chamber 12 can be imaged without backlight being caused. Door switch 17 for detecting the opening and closing of door 3 is disposed on housing 2. Protruding portion 18 for pushing door switch 17 is disposed on door 3.

The product (object to be heated) such as a box lunch, a rice ball, and a side dish is put into heating chamber 12. Seal 20 is attached to each product. Seal 20 is an attachment where heating power and a heating time are displayed as product heating control information.

This seal 20 shows the heating time pertaining to the case of heating at a heating power of, for example, 500 W assuming a time when the heating is performed by a general microwave oven for home use along with the heating time pertaining to the case of heating at a heating power of, for example, 1500 W assuming a time when heating is performed for a short period of time and at a high heating power by a microwave oven for office use. As a specific example, seal 20 displays "500 W 2 min 00 sec 1500 W 0 min 40 sec".

More specifically, the heating control information is a character string that includes, in the following order, a first character string such as "500" as a number indicating a heating amount at predetermined heating power, a second character string such as "W" indicating a unit of the heating power, and a third character string such as "2" as a number indicating the heating time at the heating power. In addition, the heating control information is a character string that includes, in the following order, a fourth character string such as "min" indicating a unit of the heating time, a fifth character string such as "00" as a number indicating the heating time at the heating power, and a sixth character string such as "sec" indicating a unit of the heating time. Furthermore, the heating control information is a character string that includes, in the following order, a seventh character string such as "1500" as a number indicating a heating amount at heating power exceeding the predetermined heating power described above and an eighth character string such as "W" indicating a unit of the heating power. Moreover, the heating control information is a character string that includes, in the following order, a ninth character string such as "0" as a number indicating the heating time at the heating power, a tenth character string such as "min" indicating a unit of the heating time, an eleventh character string such as "40" as a number indicating the heating time at the heating power, and a twelfth character string such as "sec" indicating a unit of the heating time.

In this embodiment, "watt (W)", which is an SI unit indicating a heat amount, is used as the second character string and the eighth character string. Any other character or unit may take the place of it insofar as that character or unit indicates a heating power unit. In this embodiment, "min" or "sec" as a character indicating a time unit is used as the fourth character string, the sixth character string, the tenth character string, and the twelfth character string. Any other character or unit may take the place of it insofar as that character or unit indicates a time unit.

Reading unit 19 extracts a place where the heating control information given to the product is displayed from the image captured by camera 16 and reads the characters of the heating control information (including at least a number).

Figure 3:
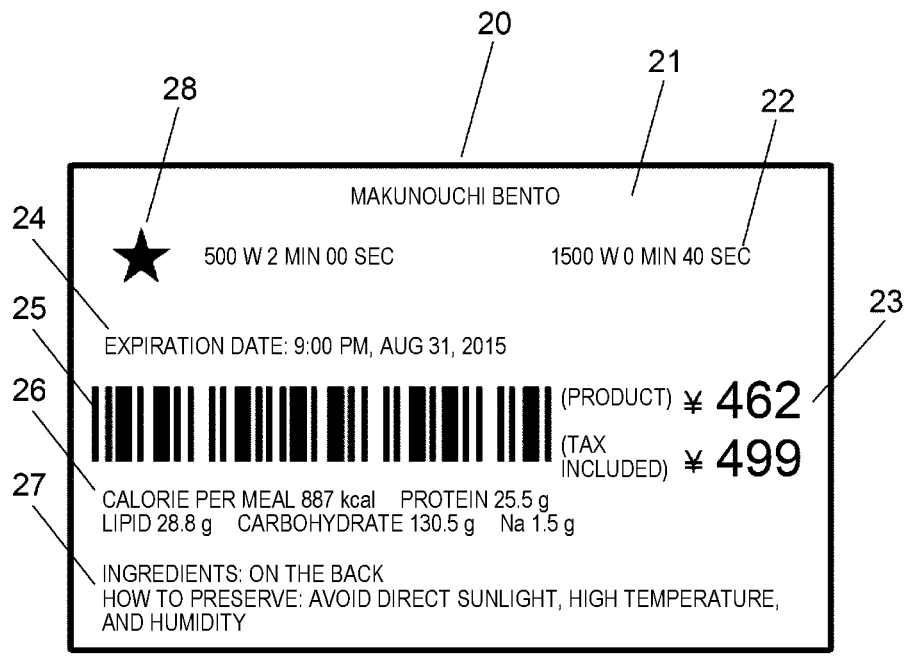
FIG. 3 is a diagram illustrating an example of a seal given to a product according to the first embodiment of the present invention.

FIG. 3 is a diagram illustrating an example of seal 20 given to the product according to the first embodiment of the present invention.

Seal 20 displays various types of information such as product name 21, heating control information 22, price information 23, expiration date information 24, barcode 25 as an example of a code symbol for product identification, nutrition information 26, and notice information 27. Lead mark 28 is displayed in seal 20, near a lead part of the character string of heating control information 22, so that reading unit 19 easily extracts heating control information 22 from these various types of information.

Reading unit 19 first extracts lead mark 28 that has a special form (predetermined shape, star herein) from the image captured by camera 16. Then, reading unit 19 reads alphanumeric characters following lead mark 28 as the character string of "500 W 200 1500 W 040". Herein, reading unit 19 does not read characters indicating time units such as "min" and "sec" and does not use these characters for interpretation even if these characters are read.

Then, reading unit 19 disassembles the character string into four in accordance with an interpretation rule determined in advance, the four being a number sequence up to "W", a three-digit number sequence following "W", a number sequence up to "W" continuing from that number sequence, and a three-digit number sequence following "W", and obtains "500", "200", "1500", and "040". In addition, reading unit 19 interprets the first digit as "min" and the following two digits as "sec" with regard to each of the second number sequence and the fourth number sequence. Furthermore, reading unit 19 interprets the first number sequence as the heating power, the second number sequence as corresponding to time, the third number sequence as the heating power, and the fourth number sequence as corresponding to time. As a result, the heating control information of "2 min at 500 W" and the heating control information of "40 sec at 1500 W" are read.

Referring back to FIG. 2, the user puts the product into heating chamber 12 after opening door 3. Once the opening of the door is detected by door switch 17, reading unit 19 reads the heating control information as described above from the image of the inside of heating chamber 12 captured by camera 16.

Error determination unit 29 of reading unit 19 will be described below.

In the example described above, reading unit 19 reads two pieces of heating control information, one being "2 min at 500 W" and the other being "40 sec at 1500 W". Herein, error determination unit 29 determines whether or not a relationship between these two pieces of heating control information is correct.

The food requires constant and determined total energy to be heated. The food will be heated within a short period of time if the heating power is high and the food will have to be heated for a long period of time if the heating power is low. The heating power and the heating time are substantially in inverse proportion to each other. Therefore, in a case where reading unit 19 has read the two pieces of heating control information, error determination unit 29 determines whether or not the relationship is the relationship of substantial inverse proportion, and determines that the reading is correct in the event of, for example, a difference of 10% or less from the inverse proportion relationship.

A reading error might occur when reading unit 19 reads heating control information 22 from the image captured by camera 16. For example, numbers similar in shape to each other, such as "6" and "9" and "0" and "8", might be read as each other. In addition, in a case where reading unit 19 makes a mistake in reading lead mark 28, other numbers might be read by mistake as the number of the heating control information because numbers are also displayed at other parts such as price information 23 and expiration date information 24 as illustrated in FIG. 3.

Heating control performed based on a number read by mistake might result in excessive overheating or heating shortage. Error determination unit 29 determines an error of the reading by reading unit 19 in order to prevent the excessive overheating and the heating shortage.

Once error determination unit 29 determines that the two pieces of heating control information have the correct relationship, reading unit 19 sends the two pieces of heating control information to heating control unit 14. Heating control unit 14 selects one of the two pieces of heating control information, the heating control information regarding the higher heating power within a heating power range allowing heating with the microwave oven to be specific, and sends the selected heating control information to operation display unit 6. Operation display unit 6 displays the heating time of the selected heating control information in liquid crystal display 7.

The user closes door 3 and presses heating start button 9 after confirming that an appropriate heating time is displayed in liquid crystal display 7. After a signal indicating the closing of the door is received from door switch 17 and a signal indicating the pressing of heating start button 9 is received from operation display unit 6, heating control unit 14 performs heating control on magnetron 13 for the heating of the product based on the heating power and the heating time of the heating control information selected as described above.

According to the above description, microwave oven 1 according to this embodiment uses lead mark 28 in reading heating control information 22 from seal 20. The present invention is not limited to that example. Heating control information 22 can be read with a high level of accuracy by location mark 128 being used that has a predetermined shape and is in a predetermined positional relationship with heating control information 22.

Figure 4:
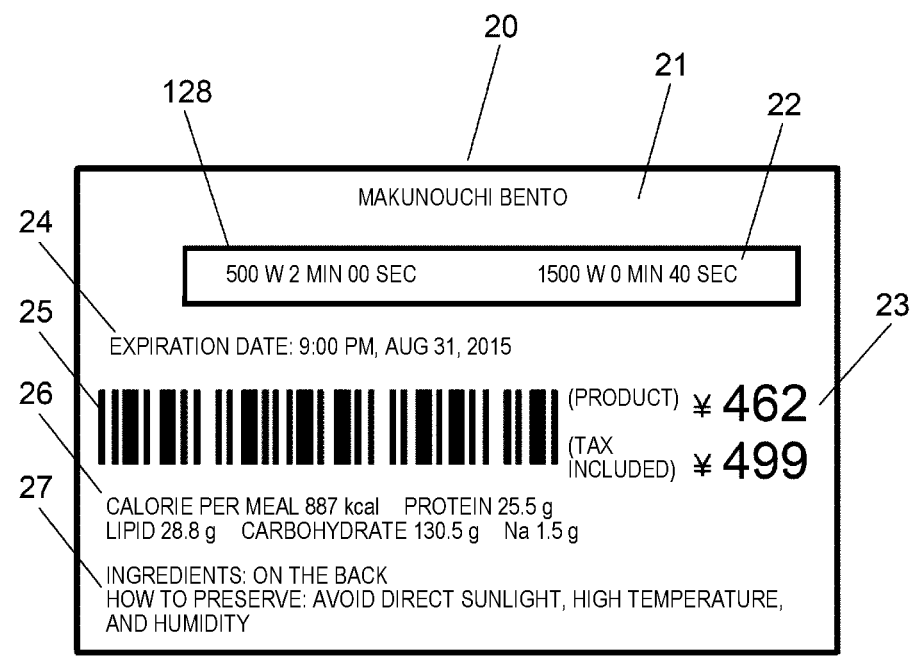
FIG. 4 is a diagram illustrating an example of a location mark displayed in the seal according to the first embodiment of the present invention.

FIG. 4 is a diagram illustrating an example of location mark 128 displayed in seal 20 according to the first embodiment of the present invention.

Rectangular location mark 128 formed to surround heating control information 22 is illustrated in the example according to FIG. 4. Reading unit 19 extracts this location mark 128 and reads heating control information 22 written in location mark 128. The shape of location mark 128 is not limited to the rectangular shape. Location mark 128 can have any shape. The positional relationship between location mark 128 and heating control information 22 is not limited to that according to the example illustrated in FIG. 4, either. Location mark 128 and heating control information 22 can have any positional relationship.

Hereinafter, operation steps of microwave oven 1 according to this embodiment will be described.

Figure 5:
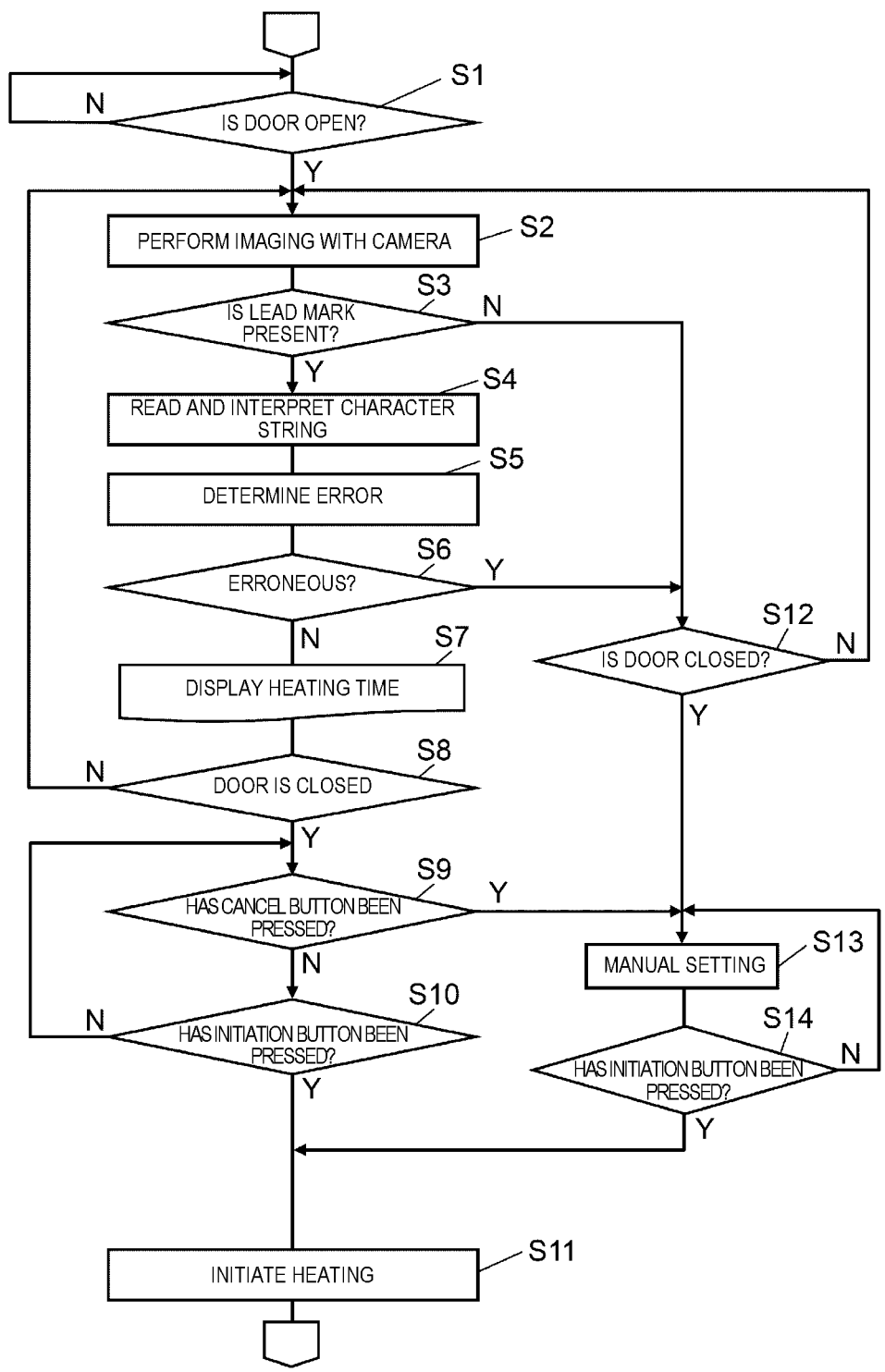
FIG. 5 is a flowchart illustrating a flow of operations of a heating control unit, a reading unit, and an error determination unit according to the first embodiment of the present invention.

FIG. 5 is a flowchart illustrating a flow of operations of heating control unit 14, reading unit 19, and error determination unit 29 according to the first embodiment of the present invention.

Reading unit 19 first determines, based on a state of door switch 17, whether or not door 3 is open (S1). The processing proceeds to Step S2 when door 3 is open (S1, YES). When door 3 is closed (S1, NO), reading unit 19 repeats Step S1 and waits for door 3 to be opened.

Reading unit 19 captures an image of a bottom surface of heating chamber 12 with camera 16 (S2). Then, the processing proceeds to Step S3.

Reading unit 19 searches for lead mark 28 (or location mark 128) in the image (S3). The processing proceeds to Step S4 after reading unit 19 has found lead mark 28 (or location mark 128) (S3, YES). The processing proceeds to Step S12 when reading unit 19 has found no lead mark 28 (or location mark 128) (S3, NO).

In Step S4, reading unit 19 reads the alphanumeric characters based on lead mark 28 (or location mark 128), reading the character string of "500 W 200 1500 W 040" in the example of the seal illustrated in FIG. 3. Then, this character string is interpreted as the two pieces of heating control information, one being "2 min at 500 W" and other being "40 sec at 1500 W", in accordance with the interpretation rule determined in advance.

Then, in Step S5, error determination unit 29 determines whether or not the heating control information read by reading unit 19 has been correctly read. Specifically, error determination unit 29 determines whether or not "40 sec at 1500 W" as the second heating control information is inversely proportional to "2 min at 500 W" as the first heating control information within a range of ±10%.

To be specific, the heating power of the second heating control information is "1500 W" and is three times the heating power of the first heating control information, "500 W", in the example described above. Accordingly, with the heating time of the first heating control information being "2 min", error determination unit 29 determines that correct reading has been conducted insofar as the heating time of the second heating control information is within ±10% of "40 sec", which is one-third of "2 min", that is, 36 sec to 44 sec.

In Step S6, it is determined whether or not the result of the determination in Step S5 is erroneous. The processing proceeds to Step S7 when the result of the determination has no error (S6, NO). The processing proceeds to Step S12 when the result of the determination is erroneous (S6, YES).

In Step S7, reading unit 19 sends the two pieces of heating control information to heating control unit 14, one being "2 min at 500 W" and the other being "40 sec at 1500 W". Then, heating control unit 14 displays "40 sec" in liquid crystal display 7, as the heating time corresponding to a heating power of "1500 W", insofar as magnetron 13 can be controlled at a maximum of 1500 W.

In Step S8, reading unit 19 determines the state of door switch 17 and determines whether or not door 3 is closed. When it is determined that door 3 is closed (S8, YES), the processing proceeds to Step S9 with the reading regarded as having been finalized. When it is determined that door 3 is not closed (S8, NO), the processing returns to Step S2 and the processing of Step S2 to Step S8 is repeated with the reading regarded as having yet to be finalized.

In Step S9, heating control unit 14 determines whether or not cancel button 10 has been pressed by the user. The processing proceeds to Step S10 when cancel button 10 has not been pressed (S9, NO). The processing proceeds to Step S13 in a case where cancel button 10 has been pressed (S9, YES). This is to detect the pressing of cancel button 10 and perform heating for heating time other than the read heating time in a case where the user confirms the heating time displayed in liquid crystal display 7 and determines that the heating time is wrong or in a case where the user intends to perform heating for heating time other than the displayed heating time.

In Step S10, heating control unit 14 determines whether or not heating start button 9 has been pressed. When heating start button 9 has been pressed (S10, YES), the processing proceeds to Step S11 and heating is initiated (S11). When heating start button 9 has not been pressed (S10, NO), the processing returns to Step S9 and the processing for determining whether or not cancel button 10 has been pressed is repeated.

The processing proceeds to Step S12 and reading unit 19 determines, by using door switch 17, whether or not door 3 is closed in a case where no lead mark 28 (or location mark 128) is found in Step S3 (S3, NO) and in a case where it is determined in Step S6 that the read character string is erroneous (S6, YES). The processing proceeds to Step S13 when door 3 is closed (S12, YES). When door 3 is not closed (S12, NO), the processing returns to Step S2 and the processing is repeated from the imaging by camera 16.

Usually, the above-described loop of returning to Step S2 from Step S12 is repeated while the user opens door 3, puts the food into heating chamber 12, and causes the food to remain stationary.

Then, the processing proceeds to Step S13 in a case where cancel button 10 is pressed in Step S9 (S9, YES) and in a case where door 3 is closed in Step S12 (S12, YES). In Step S13, heating control unit 14 receives heating time manually set by the user. This is to allow the user to manually set heating time by using time setting button group 8 in, for example, a case where heating is to be performed on food with no heating control information 22 displayed or a case where reading unit 19 cannot read heating control information 22 due to contamination or the like.

Then, in Step S14, heating control unit 14 determines whether or not heating start button 9 has been pressed. The processing proceeds to Step S11 and heating is initiated when heating start button 9 has been pressed (S14, YES). When heating start button 9 has not been pressed (S14, NO), the processing returns to Step S13 and the processing for heating control unit 14 to be subjected to the manual setting operation by the user is repeated.

In this embodiment, reading unit 19 reads the characters of heating control information 22 displayed in the product (including at least the alphanumeric characters) and heating control unit 14 controls magnetron 13 based on the heating control information as described above. Accordingly, the heating time can be automatically set without a clerk having to input a product heating time or select a button corresponding to the product and a hassle attributable to registration of a relationship between a product code and the heating time can be avoided.

In addition, error determination unit 29 determines a reading error, based on whether or not the heating power and the heating time have a correct relationship, from the heating time information at each of two pieces of the heating power, one being, for example, "500 W" and the other being, for example, "1500 W". Accordingly, appropriately heating can be performed without wrong heating attributable to wrong reading.

In addition, reading unit 19 detects the opening and closing state of the door with door switch 17, and initiates the reading based on the imaging by camera 16 when door 3 is open and finalizes read content when door 3 is closed. Accordingly, the user can create a condition facilitating the reading, by changing the place or direction of the product in a state where door 3 is open for example, in a case where the heating control information is not read well.

According to the above description of this embodiment, reading unit 19 reads the heating control information from the character string given to the product. However, the present invention is not limited to this example. For instance, reading unit 19 may read the heating control information from a barcode as an information code given to the product or a two-dimensional code with regard to one or both of an aspect related to the operation of error determination unit 29 and an aspect related to the opening and closing state of door 3 and initiation and termination of the operation of reading unit 19.

(Second Embodiment)

Hereinafter, a second embodiment of the present invention will be described.

In this embodiment, another example of seal 20 that has been described in the first embodiment will be described.

Figure 6:
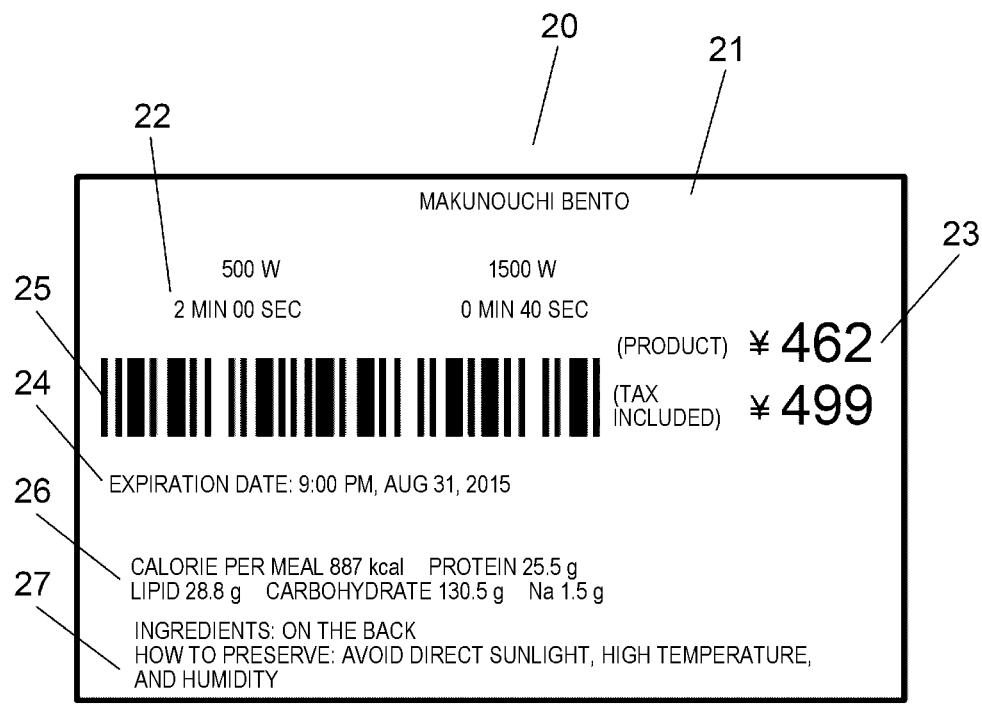
FIG. 6 is a diagram illustrating another example of the seal according to a second embodiment of the present invention.

FIG. 6 is a diagram illustrating another example of seal 20 according to the second embodiment of the present invention.

In the first embodiment, lead mark 28 or location mark 128 is given to seal 20. This lead mark 28 or location mark 128 is an eyesore for some people. An example in which heating control information 22 is placed above (directly above) barcode 25 as illustrated in FIG. 5 is illustrated as another method. According to this configuration, a pattern of barcode 25 can be a mark for identifying a place where heating control information 22 is printed, and heating control information 22 above barcode 25 can be read by reading unit 19 despite the absence of lead mark 28 or location mark 128.

In this embodiment, a case is illustrated where heating control information 22 is above barcode 25 (directly above barcode 25 herein, that is, no other information being present between barcode 25 and heating control information 22). The present invention is not limited to this example.

Reading unit 19 can appropriately read heating control information 22 in association with the position of barcode 25 insofar as seal 20 is prepared such that heating control information 22 is present at a predetermined position determined in advance with respect to barcode 25 and the positional relative relationship is stored.

Seal 20 according to this embodiment also differs from seal 20 according to the first embodiment in that only the heating time information of "2 min 00 sec 0 min 40 sec" is displayed as heating control information 22 with the heating power information of "500 W" and "1500 W" not included. Although characters such as "500 W" and "1500 W" are also displayed above heating control information 22 for a case where, for example, a product buyer performs heating with another machine, reading unit 19 reads nothing but the heating time information.

This is because reading unit 19 does not have to read the heating power information when, for example, display of the heating time at 500 W and the heating time at 1500 W in this order is determined in advance as a display rule for heating control information 22.

When a small amount of information is to be read as described above, a mistake is less likely to be made. In addition, sizeable display can be conducted, and thus the likelihood of the mistake can be further reduced. For example, the heating power information is displayed with a small size and the heating time information is displayed with a significant size as illustrated in FIG. 6.

In this embodiment, reading unit 19 first extracts barcode 25 from the image captured by camera 16.

Then, reading unit 19 reads the number above this barcode 25 as a number sequence of "200040". Then, this number sequence is disassembled into a number sequence of "200" and a number sequence of "040", in accordance with an interpretation rule determined in advance, with the first three digits being regarded as the heating time information at a heating power of "500 W" and the following three digits being regarded as the heating time information at a heating power of "1500 W". Furthermore, reading unit 19 interprets the first digit of each as an indication of "min" and the following two digits of each as an indication of "sec" and reads two pieces of heating control information 22, one being "2 min at 500 W" and the other being "40 sec at 1500 W".

In this embodiment, display of lead mark 28 and location mark 128 is unnecessary since barcode 25 is used as the mark as described above. Accordingly, unsightly display causing discomfort is avoided. In addition, a rule is determined in advance such that the heating time information regarding each of, for example, "500 W" and "1500 W" is displayed as heating control information 22. In this manner, the number of characters of heating control information 22 that are displayed can be reduced and sizeable display can be conducted, and thus the likelihood of a mistake during the reading can be re duce d.

(Third Embodiment)

Hereinafter, a third embodiment of the present invention will be described.

Figure 7:
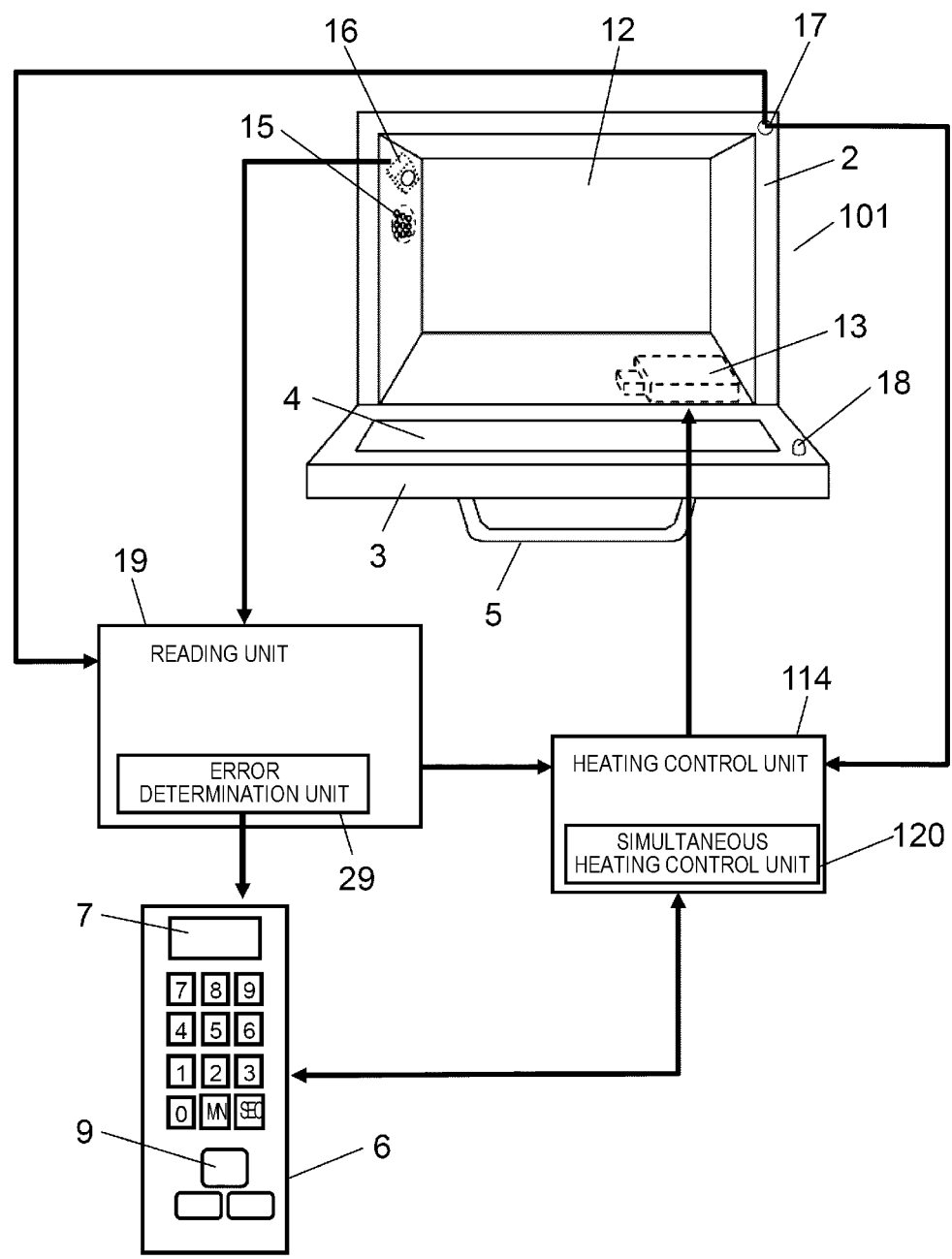
FIG. 7 is a schematic configuration diagram of a microwave oven according to a third embodiment of the present invention.

FIG. 7 is a schematic configuration diagram of microwave oven 101 according to the third embodiment of the present invention.

Microwave oven 101 according to this embodiment differs from microwave oven 1 described in the first embodiment in that heating control unit 114 has simultaneous heating control unit 120.

In a case where two or more products are in heating chamber 12, simultaneous heating control unit 120 calculates heating control information for simultaneous heating control from individual pieces of heating control information so that the plurality of products are heated at the same time.

For example, it is assumed that two box lunches are in heating chamber 12, one being larger box lunch A and the other being smaller box lunch B. At this time, the image of the inside of heating chamber 12 captured by camera 16 includes heating control information 22 attached to each of box lunch A and box lunch B. These two pieces of heating control information 22 are read by reading unit 19 and are converted into heating control information regarding the respective box lunches. Herein, the reading of heating control information 22 by reading unit 19 is performed by the method described in the first embodiment or the second embodiment.

For example, reading unit 19 converts heating control information 22 regarding box lunch A into the heating control information of "2 min at 1500 W" and converts heating control information 22 regarding box lunch B into the heating control information of "1 min 30 sec at 1500 W", and sends each to heating control unit 114. Once heating control unit 114 receives the plurality of heating control information pieces, simultaneous heating control unit 120 creates the heating control information pertaining to the case of simultaneous heating of the plurality of products. In other words, in this case, simultaneous heating control unit 120 calculates the heating control information of "3 min 30 sec at 1500 W" by adding up the heating times with the plurality of heating control information pieces sharing the same heating power.

Heating control unit 114 displays the heating control information created by simultaneous heating control unit 120 in liquid crystal display 7. Then, heating control unit 114 controls magnetron 13 in accordance with the heating control information and heats the plurality of products in heating chamber 12 once heating start button 9 is pressed by the user.

Figure 8:
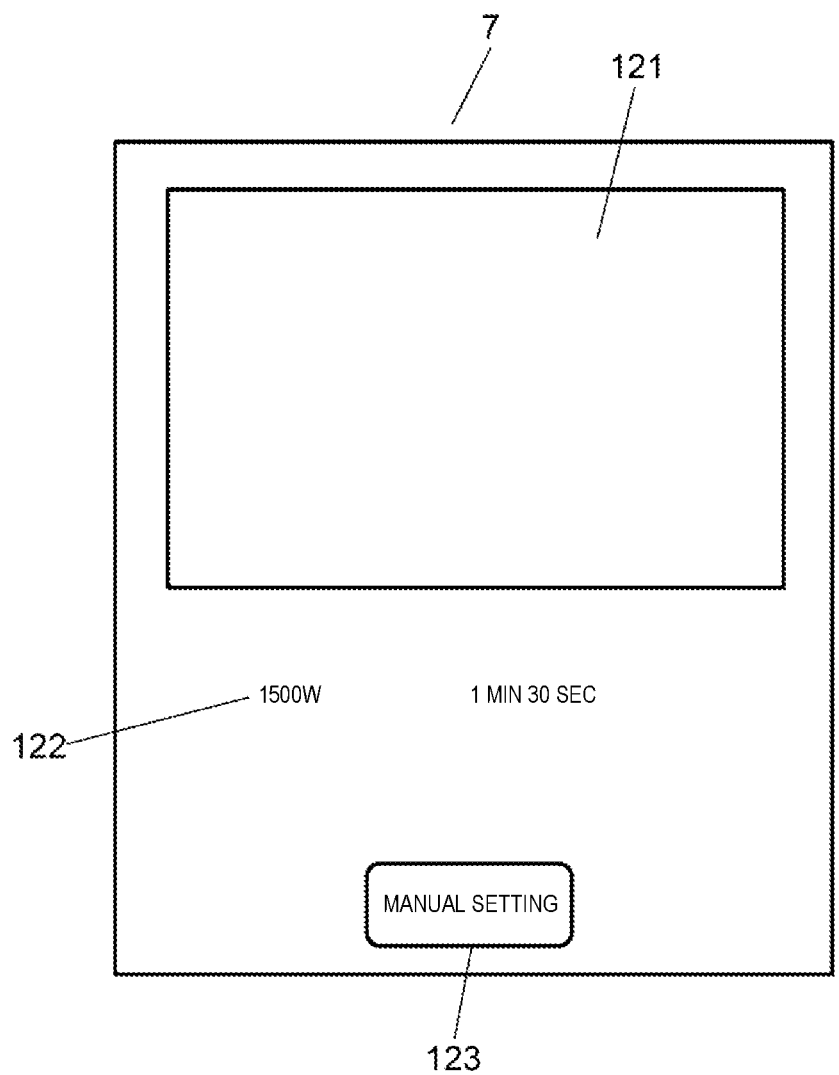
FIG. 8 is a diagram illustrating an example of display by a liquid crystal display of the microwave oven according to the third embodiment of the present invention.

FIG. 8 is a diagram illustrating an example of the display by liquid crystal display 7 of microwave oven 101 according to the third embodiment of the present invention.

When door 3 is opened, the opening of door 3 is detected by door switch 17. Then, camera 16 captures the image of the inside of heating chamber 12 and an in-chamber image 121 captured by camera 16 is displayed in liquid crystal display 7 as illustrated in FIG. 8. Heating control information display portion 122 is disposed below in-chamber image 121, and the heating control information read by reading unit 19 is displayed in heating control information display portion 122.

The user closes door 3 and presses heating start button 9 when the heating may be performed in accordance with the heating control information displayed in heating control information display portion 122. Once the closing of door 3 is detected by door switch 17 and the pressing of heating start button 9 is detected, heating control unit 114 controls magnetron 13 in accordance with heating control content displayed in heating control information display portion 122 and heats the product in heating chamber 12. Switch button 123 is disposed in liquid crystal display 7. When the user touches switch button 123, the display is switched to a screen for manual heating control content setting. Although liquid crystal display 7 according to this embodiment described herein functions as a so-called liquid crystal touch panel and is capable of receiving inputs, switch button 123 may also be disposed separately from liquid crystal display 7.

Figure 9:
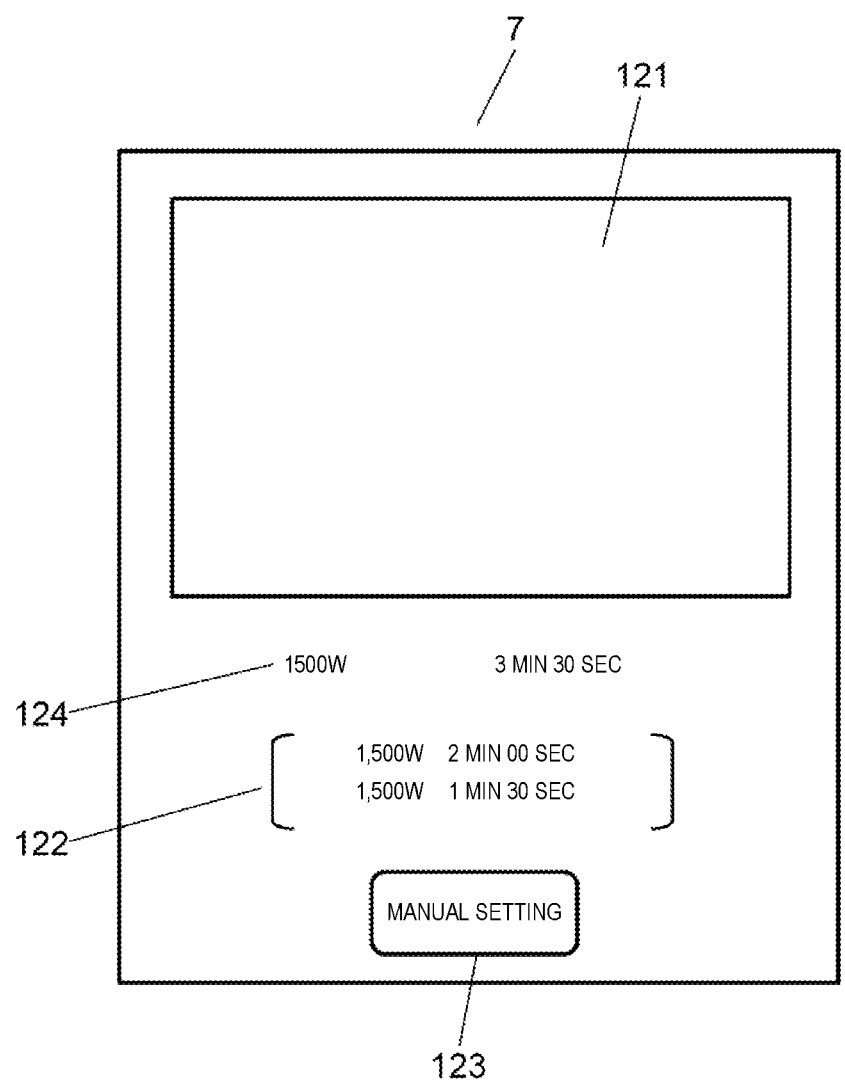
FIG. 9 is a diagram illustrating an example of the display by the liquid crystal display according to the third embodiment of the present invention in a case where two products are in a heating chamber.

FIG. 9 is a diagram illustrating an example of the display by liquid crystal display 7 according to the third embodiment of the present invention in a case where two products are in heating chamber 12.

The two products are in heating chamber 12, one being box lunch A and the other being box lunch B. Camera 16 captures the image of the inside of heating chamber 12 including the two box lunches. At this time, two pieces of the heating control information read by reading unit 19 are displayed in heating control information display portion 122.

In addition, the heating control information created by simultaneous heating control unit 120 and pertaining to the case of simultaneous heating of these two products is displayed in simultaneous heating control information display portion 124. The user closes door 3 and presses heating start button 9 when the heating may be performed in accordance with this simultaneous heating control information. Once the closing of the door is detected by door switch 17 and the pressing of heating start button 9 is detected, heating control unit 114 controls magnetron 13 in accordance with heating control content displayed in simultaneous heating control information display portion 124 and heats the products in heating chamber 12.

Figure 10:
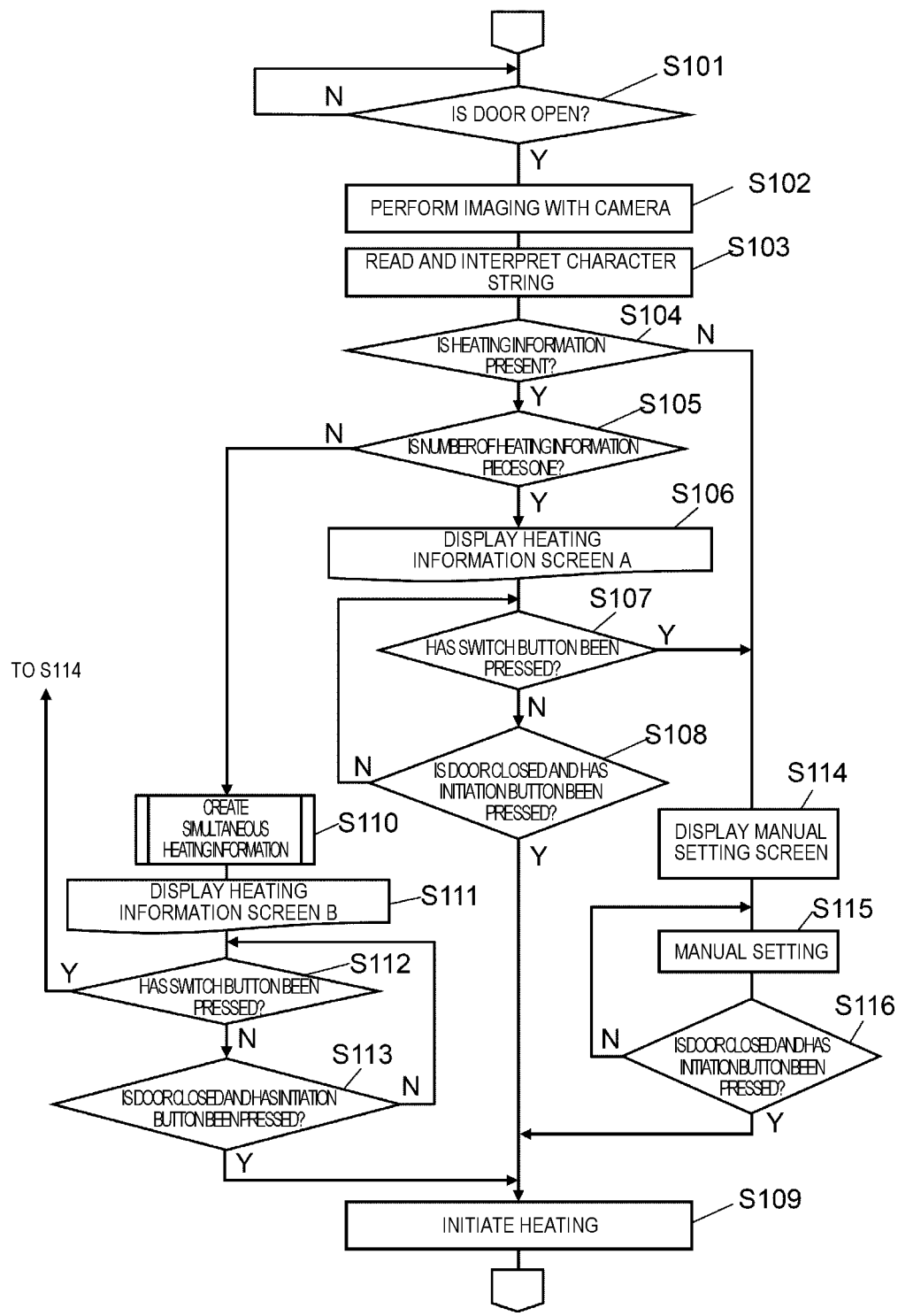
FIG. 10 is a flowchart illustrating a flow of the operations of the heating control unit and the reading unit according to the third embodiment of the present invention.

FIG. 10 is a flowchart illustrating a flow of the operations of heating control unit 114 and reading unit 19 according to the third embodiment of the present invention.

In Step S101, reading unit 19 determines the state of door switch 17. The processing proceeds to Step S102 when door 3 is open (S101, YES). Reading unit 19 repeats Step S101 and waits for door 3 to be opened when door 3 is closed (S101, NO).

In Step S102, reading unit 19 captures the image of the bottom surface of heating chamber 12 with camera 16. Then, the processing proceeds to Step S103.

In Step S103, reading unit 19 extracts heating control information 22 from the image and reads the image. Then, the processing proceeds to Step S104. A method for the reading is as described in the first embodiment and the second embodiment.

In Step S104, reading unit 19 converts the read information into the heating control information by the method described in the first embodiment and determines whether or not the heating control information is included in the image. The processing proceeds to Step S105 when the heating control information is included (S104, YES). The processing proceeds to Step S114 when it is determined by reading unit 19 that the image does not include the heating control information (S104, NO).

In Step S105, heating control unit 114 determines whether or not the number of the heating control information pieces included in the image is one. The processing proceeds to Step S106 when it is determined by heating control unit 114 that the number of the heating control information pieces is one (S105, YES). The processing proceeds to Step S110 when it is determined by heating control unit 114 that a plurality of the heating control information pieces are included in the image (S105, NO).

In Step S106, heating control unit 114 displays heating information screen A, which is a display screen at a time when only one heating control information piece is included and is illustrated in FIG. 8, in liquid crystal display 7. Then, the processing proceeds to Step S107.

In Step S107, heating control unit 114 determines whether or not switch button 123 illustrated in FIG. 8 has been pressed. The processing proceeds to Step S114 when it is determined by heating control unit 114 that switch button 123 has been pressed (S107, YES). The processing proceeds to Step S108 when it is determined by heating control unit 114 that switch button 123 has not been pressed (S107, NO).

In Step S108, heating control unit 114 determines whether door 3 remains closed by using door switch 17 and determines whether or not heating start button 9 has been pressed. When it is determined by heating control unit 114 that door 3 is closed and heating start button 9 has been pressed (S108, YES), the processing proceeds to Step S109 and heating is initiated. When it is determined by heating control unit 114 that at least one of the conditions is not satisfied (S108, NO), the processing returns to Step S107 and the processing is repeated from the determination on whether or not switch button 123 has been pressed.

In addition, the processing proceeds to Step S110 when heating control unit 114 determines in Step S105 that the plurality of heating control information pieces are included in the image (S105, NO). In Step S110, simultaneous heating control unit 120 creates, based on the plurality of heating control information pieces, the heating control information pertaining to the case of simultaneous heating of the plurality of objects to be heated.

Specifically, simultaneous heating control unit 120 creates the simultaneous heating control information of "3 min 30 sec at 1500 W" in the event of, for example, the presence of two heating control information pieces, one being "2 min at 1500 W" regarding box lunch A and the other being "1 min 30 sec at 1500 W" regarding box lunch B. Then, the processing proceeds to Step S111.

In Step S111, heating control unit 114 displays heating information screen B, which is a display screen at a time when the plurality of heating control information pieces are included and is illustrated in FIG. 9, in liquid crystal display 7. Then, the processing proceeds to Step S112.

In Step S112, heating control unit 114 determines whether or not switch button 123 illustrated in FIG. 9 has been pressed. The processing proceeds to Step S114 when it is determined by heating control unit 114 that switch button 123 has been pressed (S112, YES). The processing proceeds to Step S113 when it is determined by heating control unit 114 that switch button 123 has not been pressed (S112, NO).

In Step S113, heating control unit 114 determines whether door 3 remains closed by using door switch 17 and determines whether or not heating start button 9 has been pressed. When it is determined by heating control unit 114 that door 3 remains closed and heating start button 9 has been pressed (S113, YES), the processing proceeds to Step S109 and heating is initiated. When it is determined by heating control unit 114 that at least one of the conditions is not satisfied (S113, NO), the processing returns to Step S112 and the processing is repeated from the determination on whether or not switch button 123 has been pressed.

The processing proceeds to Step S114 in a case where it is determined in Step S104 that the captured image has no heating control information (S104, NO) or in a case where the manual setting is selected by switch button 123 in Step S107 (S107, YES).

In Step S114, heating control unit 114 displays, in liquid crystal display 7, a screen for manual setting for heating power and heating time setting. Then, in Step S115, heating control unit 114 receives the user's manual setting. In Step S116, heating control unit 114 determines whether door 3 remains closed by using door switch 17 and determines whether or not heating start button 9 has been pressed. When it is determined by heating control unit 114 that door 3 remains closed and heating start button 9 has been pressed (S116, YES), the processing proceeds to Step S109 and heating is initiated. When it is determined by heating control unit 114 that at least one of the conditions is not satisfied (S116, NO), the processing returns to Step S115 and the receiving of the user's manual setting is repeated.

According to the above description of this embodiment, the processing proceeds to Step S114 and the switching to the manual setting screen is performed when the absence of the heating control information is determined in Step S104. The present invention is not limited to this example. For instance, the processing may proceed to Step S114 when a determination that no heating information is read despite waiting for a certain period of time until the user's decision on the product position is made as an alternative to an immediate determination that the heating information is absent.

In addition, the processing described in the first embodiment may be performed as well. In other words, when it is determined in Step S104 that the heating control information is absent, reading unit 19 determines, by using door switch 17, whether or not door 3 is closed (refer to S12 in FIG. 5). Then, the processing proceeds to Step S114 when door 3 is closed. When door 3 is not closed, the processing may return to Step S102 for the processing to be repeatedly performed from the imaging by camera 16.

(Fourth Embodiment)

Hereinafter, an example of simultaneous heating control unit 120 other than that according to the third embodiment will be described as a fourth embodiment of the present invention.

In the above description of the third embodiment, an example has been described in which the plurality of products are in heating chamber 12 and simultaneous heating control unit 120 adds up the heating times of the plurality of products in the case of simultaneous heating of the plurality of products. However, the present invention is not limited to this example. In a case where a plurality of products are in heating chamber 12, the amount of the food increases, and thus efficiency of the heating by magnetron 13 increases and the heating can be performed with a high level of efficiency in general cases. Accordingly, the heating can be conducted within heating time shorter than the times simply added up.

In view of this fact, simultaneous heating control unit 120 performs calculation based on a predetermined calculation rule for heating for a total of "3 min 30 sec", instead of heating for "4 min" resulting from simple addition, in a case where, for example, two box lunches A each requiring "2 min at 1500 W" are in.

Specifically, in a case where the heating control information pieces of two products are read with these requiring the same heating power, the longer heating time is left as it is, a heating time is calculated by the heating time of the heating control information regarding the one with the shorter heating time being multiplied by "0.75", and then the heating time is added. In a case where the number of box lunches A is two in the case of the example described above, the heating times are equal to each other, and thus multiplication of either one of the two, each being "2 min", by "0.75" results in "1 min 30 sec" and "3 min 30 sec" is obtained by this being added to the other "2 miN".

In the case of heating of box lunch A (2 min at 1500 W) and box lunch B (1 min 30 sec at 1500 W) that have different heating times, the longer heating time is "2 min" and the shorter heating time is "1 min 30 sec", and thus approximately 1 min 08 sec is obtained by multiplication of the shorter "1 min 30 sec" by "0.75". Accordingly, "3 min 08 sec" is calculated by this being added to "2 min".

By the calculation for adding up being conducted based on the above-described predetermined rule that causes the one with the longer heating time, that is, the larger one of the heating control information pieces regarding the two products, to have a greater effect, the heating can be performed for an appropriate heating time whether a plurality of food products have the same size or not.

In a case where three or more products are in heating chamber 12, processing is performed such that the second-longest heating time is multiplied by "0.75", the third-longest heating time is multiplied by a value less than "0.75" such as "0.6", and the fourth-longest heating time is multiplied by a value less than the value less than "0.75". By constants for multiplication being determined in advance in association with the order of the lengths of the heating times as described above, the heating time pertaining to the case of simultaneous heating can be appropriately calculated regardless of the number of products.

A case where the heating control information pieces of a plurality of products have different heating power requirements such as the case of simultaneous heating of box lunch A requiring "2 min at 1500 W" and box lunch C requiring "30 sec at 500 W" will be described below.

In general, a small amount of food is recommended to be heated with low heating power. When high heating power is employed for a small amount of food, a low level of efficiency ensues and risks and the like are entailed in the form of microwaves not penetrating the food being concentrated on a part inside heating chamber 12 to lead to an increase in temperature or the microwaves returning to magnetron 13 to cause magnetron 13 to rise in temperature. Therefore, heating with low heating power is recommended.

Simultaneous heating of the plurality of products along with another product, however, the amounts of the food are added up to reach a sufficiently large amount. Therefore, inefficiency does not arise even in the event of high heating power employment. In this case, conversion of the heating time at a time of heating power adjustment is performed first in compliance with the highest one of the heating power of the plurality of products for the product requiring heating power that is not the highest heating power. In other words, "30 sec" at "500 W" may be a heating time of "10 sec", one-third of "30 sec", at a heating power of "1500 W" as three times the "500 W" heating power. In addition, "2 min" and "10 sec" are added up, and the longer "2 min" is left as it is as described above and the shorter "10 sec" is multiplied by "0.75" to become approximately 8 sec. This means the simultaneous heating of the two products may take a total of "2 min 08 sec".

The flow of the operations described above will be described in more detail with reference to FIG. 11.

Figure 11:
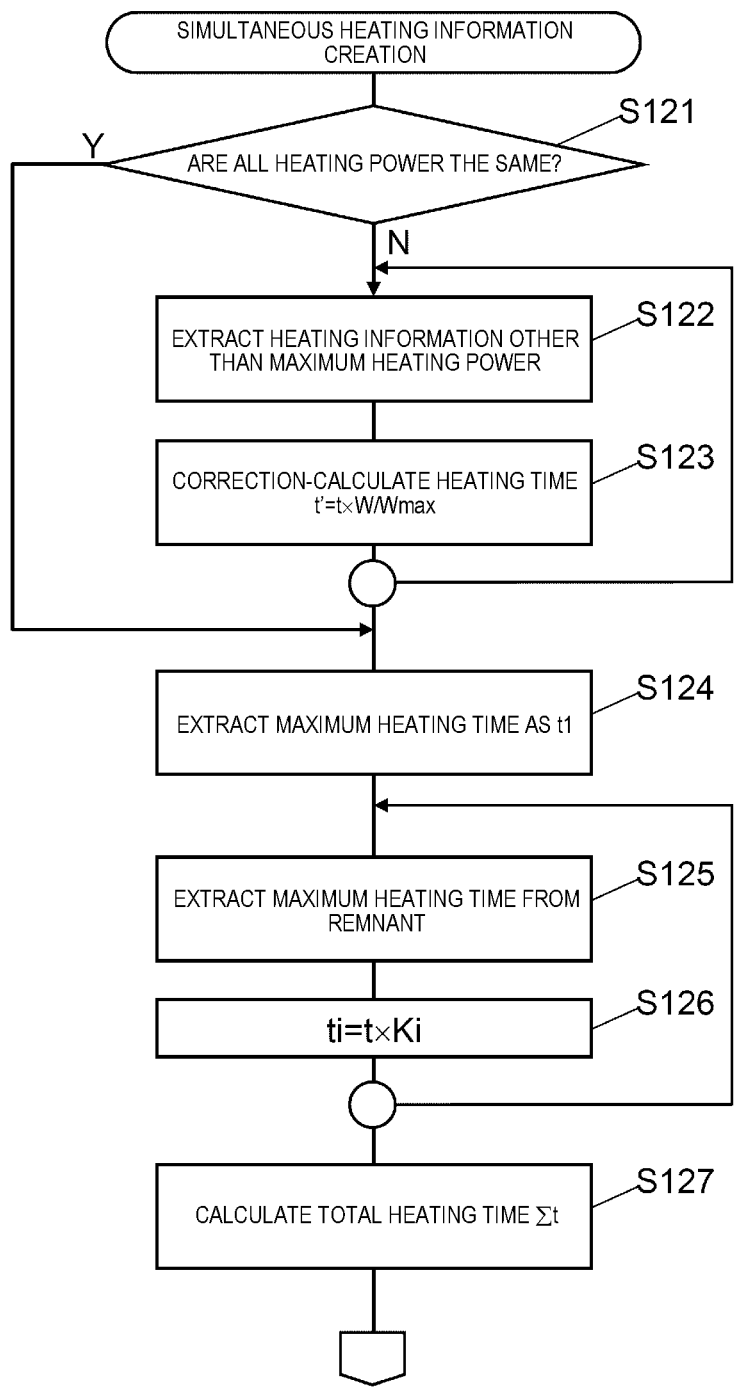
FIG. 11 is a flowchart illustrating a specific processing example regarding simultaneous heating information creation processing illustrated in Step S110 in FIG. 10 and conducted by a simultaneous heating control unit according to a fourth embodiment of the present invention.

FIG. 11 is a flowchart illustrating a specific processing example regarding simultaneous heating information creation processing illustrated in Step S110 in FIG. 10 and conducted by simultaneous heating control unit 120 according to the fourth embodiment of the present invention.

As illustrated in FIG. 11, simultaneous heating control unit 120 determines in Step S121 whether or not the plurality of heating control information pieces have the same heating power without exception. The processing proceeds to Step S122 when it is determined by simultaneous heating control unit 120 that heating information pieces different in heating power are included (S121, NO). The processing proceeds to Step S124 with the processing omitted when it is determined by simultaneous heating control unit 120 that all the heating information pieces have the same heating power (S121, YES).

In Step S122, simultaneous heating control unit 120 extracts the heating information other than the maximum heating power among the plurality of heating information pieces. Then the processing proceeds to Step S123.

In Step S123, simultaneous heating control unit 120 performs correction calculation so that the heating time of the heating information with the heating power less than the maximum heating power corresponds to the maximum heating power. During the correction calculation, corrected heating time t' is calculated as t×W/Wmax assuming, for example, that the heating time of the target heating information is t, the heating power is W, and the maximum heating power is Wmax. The processing proceeds to Step S124 after the processing of Step S122 and Step S123 is repeated by the same number of times as the number of the heating information pieces.

In Step S124, simultaneous heating control unit 120 extracts the maximum heating time as t1 from the plurality of heating information pieces. Then, in Step S125, simultaneous heating control unit 120 extracts the longest heating time from the rest of the heating information.

Then, in Step S126, simultaneous heating control unit 120 multiplies the heating time by a constant Ki determined in advance depending on the order of the length of the heating time of the heating information and calculates corrected heating time ti as t×Ki. The processing of Step S125 and Step S126 is repeated by the same number of times as the number of heating information pieces. Then, the processing proceeds to Step S127.

In Step S127, total heating time is calculated by all the ti correction-calculated from maximum heating time t1 being added up. With regard to the heating power, the heating is performed at the maximum heating power of all the heating information.

As described above, in this embodiment, a heating condition is determined in view of a change in efficiency attributable to a change in amount, instead of simple heating time addition, in a case where a plurality of heating information pieces are present. Accordingly, utility and a heating performance can be improved based on heating for a short period of time without extra energy being used. In addition, heating for optimal heating time can be performed, in view of the change in efficiency, with respect to the plurality of heating information pieces different in heating power as well.

In the third embodiment and the fourth embodiment, reading unit 19 may be configured to read the heating control information from a barcode as an information code given to the product or a two-dimensional code.

As described above, a first aspect of the embodiments is configured to be provided with a heating chamber in which an object to be heated is stored, a heating unit heating the object to be heated stored in the heating chamber, an imaging unit imaging an inside of the heating chamber, a reading unit extracting a character of heating control information from an attachment attached to the object to be heated and reading that character, and a heating control unit controlling the heating unit based on the heating control information read by the reading unit.

According to this configuration, the imaging unit images the inside of the heating chamber, the reading unit extracts the character of the heating control information (including at least a number) from the captured image and reads that character, and the heating control unit controls the heating unit based on the read heating control information. Accordingly, the heating time can be automatically set without a clerk having to input a product heating time or select a button corresponding to the product and a hassle attributable to registration of a relationship between a product code and the heating time can be avoided.

In addition, a second aspect according to the first aspect is configured such that the heating control information includes heating time at each of a plurality of pieces of heating power and the reading unit has an error determination unit determining a reading error from the heating time at each of the plurality of pieces of heating power.

According to this configuration, the reading unit reads the heating time at each of the plurality of pieces of the heating power and the determination unit determines the reading error based on the heating time at each of the plurality of pieces of the heating power. Accordingly, the heating time can be automatically set without a clerk having to input a product heating time or select a button corresponding to the product and without erroneous heating control attributable to wrong reading being performed and a hassle attributable to registration of a relationship between a product code and the heating time can be avoided.

A third aspect according to the first aspect is configured to further include a door opening and closing the heating chamber and a door switch detecting open and closed states of the door, in which the reading unit initiates the reading of the heating control information once the door-open state is detected by the door switch.

According to this configuration, the door switch detects the opening and closing of the door, and the reading unit initiates the reading of the heating control information once the door-open state is detected. In this manner, the reading of the heating control information can be initiated at a moment when the user is to put food into the chamber. Accordingly, a reading state can be achieved when the food is put by the user and stabilized in position, and the heating control information can be quickly read. Therefore, the heating time can be automatically set without a clerk having to input a product heating time or select a button corresponding to the product and a hassle attributable to registration of a relationship between a product code and the heating time can be avoided.

A fourth aspect according to the first aspect is configured to further include a door opening and closing the heating chamber and a door switch detecting open and closed states of the door, in which the reading unit finalizes the reading of the heating control information once the door-closed state is detected by the door switch.

According to this configuration, the door switch detects the opening and closing of the door, and the reading unit finalizes the reading of the heating control information once the door-closed state is detected. In this manner, the reading is performed in a state where the food is put into the chamber by the user and stabilized in position, and the reading terminates when the user closes the door with the read information at the time finalized. Accordingly, the heating control information can be finalized when the heating is initiated by the user, and the heating time can be automatically set without a clerk having to input a product heating time or select a button corresponding to the product and a hassle attributable to registration of a relationship between a product code and the heating time can be avoided.

A fifth aspect according to the first aspect is configured such that the attachment attached to the object to be heated has a code symbol for identification of the object to be heated placed near the character of the heating control information and having a predetermined positional relationship with the character of the heating control information and the reading unit extracts the character of the heating control information based on the positional relationship with respect to the code symbol.

According to this configuration, the code symbol for identification of the object to be heated such as food and the character of the heating control information are placed with the predetermined positional relationship, and the reading unit extracts the character of the heating control information from the positional relationship with respect to the code symbol. Accordingly, the character and number of the heating control information can be appropriately extracted and read, distinguished from another character or number information, even if such character or number information is present. Therefore, the heating time can be automatically set without a clerk having to input a product heating time or select a button corresponding to the product and a hassle attributable to registration of a relationship between a product code and the heating time can be avoided.

In addition, in a sixth aspect according to the first to fifth aspects, the heating control unit has a simultaneous heating control unit generating heating control information pertaining to a case of simultaneous heating based on a plurality of pieces of the heating control information when the plurality of pieces of the heating control information have been read by the reading unit.

According to this configuration, appropriate heating can be performed at one time even in the case of heating of a plurality of the objects to be heated.

In addition, the reading unit according to an aspect may read the heating control information from a barcode as an information code given to the product or a two-dimensional code.

In other words, a seventh aspect is provided with a heating chamber in which an object to be heated is stored, a heating unit heating the object to be heated stored in the heating chamber, an imaging unit imaging an inside of the heating chamber, a reading unit extracting an information code of heating control information from an attachment attached to the object to be heated and reading that information code, and a heating control unit controlling the heating unit based on the heating control information read by the reading unit. The heating control information includes heating time at each of a plurality of pieces of heating power and the reading unit is configured to have an error determination unit determining a reading error from the heating time at each of the plurality of pieces of heating power.

According to this configuration, the imaging unit images the inside of the heating chamber, the reading unit extracts the information code including the heating control information from the captured image and reads the heating time at each of the plurality of pieces of the heating power, and the determination unit determines the reading error based on the heating time at each of the plurality of pieces of the heating power. Accordingly, the heating time can be automatically set without a clerk having to input a product heating time or select a button corresponding to the product and without erroneous heating control attributable to wrong reading being performed and a hassle attributable to registration of a relationship between a product code and the heating time can be avoided.

In addition, an eighth aspect is provided with a heating chamber in which an object to be heated is stored, a heating unit heating the object to be heated stored in the heating chamber, an imaging unit imaging an inside of the heating chamber, a reading unit extracting an information code of heating control information from an attachment attached to the object to be heated and reading that information code, a heating control unit controlling the heating unit based on the heating control information read by the reading unit, a door opening and closing the heating chamber, and a door switch detecting open and closed states of the door. The reading unit is configured to initiate the reading of the heating control information once the door-open state is detected by the door switch.

According to this configuration, the door switch detects the opening and closing of the door, and the reading unit initiates the reading of the heating control information once the door-open state is detected. In this manner, the reading of the heating control information can be initiated at a moment when the user is to put food into the chamber. Accordingly, a reading state can be achieved when the food is put by the user and stabilized in position, and the heating control information can be quickly read. Therefore, the heating time can be automatically set without a clerk having to input a product heating time or select a button corresponding to the product and a hassle attributable to registration of a relationship between a product code and the heating time can be avoided.

In a ninth aspect according to the eighth aspect, the reading unit is configured to finalize the reading of the heating control information once the door-closed state is detected by the door switch.

According to this configuration, the door switch detects the opening and closing of the door, and the reading unit finalizes and terminates the reading of the heating control information once the door-closed state is detected. In this manner, the reading is performed in a state where the food is put into the chamber by the user and stabilized in position, and the reading terminates when the user closes the door with the read information at the time finalized. Accordingly, the heating control information can be finalized when the heating is initiated by the user, and the heating time can be automatically set without a clerk having to input a product heating time or select a button corresponding to the product and a hassle attributable to registration of a relationship between a product code and the heating time can be avoided.

A tenth aspect is provided with a heating chamber in which an object to be heated is stored, a heating unit heating the object to be heated stored in the heating chamber, an imaging unit imaging an inside of the heating chamber, a reading unit extracting an information code of heating control information from an attachment attached to the object to be heated and reading that information code, and a heating control unit controlling the heating unit based on the heating control information read by the reading unit. The heating control unit has a simultaneous heating control unit generating heating control information pertaining to a case of simultaneous heating based on a plurality of pieces of the heating control information when the plurality of pieces of the heating control information have been read by the reading unit.

According to this configuration, appropriate heating can be performed at one time even in the case of heating of a plurality of the objects to be heated.

INDUSTRIAL APPLICABILITY

As described above, according to the present invention, an exceptional effect can be achieved by the heating time being automatically set without a clerk having to input a product heating time or select a button corresponding to the product and a hassle attributable to registration of a relationship between a product code and the heating time being avoided. Therefore, the present invention can be effectively applied to heating cookers in general, such as microwave ovens for home use, rice cookers, and IH cooking heaters, as well as microwave ovens for use in stores.

REFERENCE MARKS IN THE DRAWINGS 1, 101 Microwave oven
2 Housing
3 Door
4 Glass window
5 Handle
6 Operation display unit
7 Liquid crystal display
8 Time setting button group
9 Heating start button
10 Cancel button
11 Pause button
12 Heating chamber
13 Magnetron (heating unit)
14, 114 Heating control unit
15 Lamp
16 Camera (imaging unit)
17 Door switch
18 Protruding portion
19 Reading unit
20 Seal
21 Product name
22 Heating control information
23 Price information
24 Expiration date information
25 Barcode (code symbol)
26 Nutrition information
27 Notice information
28 Lead mark
29 Error determination unit
120 Simultaneous heating control unit
121 In-chamber image [image]
122 Heating control information display portion
123 Switch button
124 Simultaneous heating control information display portion
128 Location mark

The invention claimed is:

1. A heating cooker comprising:
   a heating chamber in which an object to be heated is stored;
   a heating unit configured to heat the object to be heated stored in the heating chamber;
   an imaging unit imaging an attachment of the object to be heated inside of the heating chamber, the attachment being attached to the object to be heated and displaying a first heating control information and a second heating control information;
   a reader configured to extract a character of the first heating control information and the second heating control information from the attachment and read the character; and
   a controller configured to control the heating unit based on the first heating control information and the second heating control information read by the reader,
   wherein the first heating control information comprises a first heating power and a first heating time at the first heating power, and the second heating control information comprises a second heating power and a second heating time at the second heating power, and the second heating power differs from the first heating power, and wherein the reader comprises an error determination device, and the error determination device is configured to determine a reading error based on whether a difference between a value A and the second heating time is within a predetermined range from the following expression:

A=(the first heating power/the second heating power)*(the first heating time).

2. The heating cooker of claim 1,
wherein the attachment attached to the object to be heated has a code symbol for identification of the object to be heated placed near the character of the heating control information and having a predetermined positional relationship with the character of the heating control information, and
wherein the reader extracts the character of the heating control information based on the positional relationship with respect to the code symbol.

3. The heating cooker of claim 1,
wherein the controller includes a simultaneous heating controller configured to generate heating control information pertaining to a case of simultaneous heating based on a plurality of pieces of the heating control information when the plurality of pieces of the heating control information have been read by the reader.

4. The heating cooker of claim 2,
wherein the controller includes a simultaneous heating controller configured to generate heating control information pertaining to a case of simultaneous heating based on a plurality of pieces of the heating control information when the plurality of pieces of the heating control information have been read by the reader.

* * * * *